US012568955B2

(12) United States Patent
Frye

(10) Patent No.: US 12,568,955 B2
(45) Date of Patent: Mar. 10, 2026

(54) WILDLIFE GUARD FOR CUTOUT FUSE HOLDER

(71) Applicant: Central Moloney, Inc., White Hall, AR (US)

(72) Inventor: Kevin D. Frye, Star City, AR (US)

(73) Assignee: Central Moloney, Inc., White Hall, AR (US)

( * ) Notice: Subject to any disclaimer, the term of this patent is extended or adjusted under 35 U.S.C. 154(b) by 233 days.

(21) Appl. No.: 18/587,566

(22) Filed: Feb. 26, 2024

(65) Prior Publication Data

US 2025/0268244 A1     Aug. 28, 2025

(51) Int. Cl.
    A01M 29/30       (2011.01)
    H01H 85/02       (2006.01)
(52) U.S. Cl.
    CPC ........ A01M 29/30 (2013.01); H01H 85/0241 (2013.01)
(58) Field of Classification Search
    CPC ............................ A01M 29/30; H01H 85/0241
    See application file for complete search history.

(56) References Cited

U.S. PATENT DOCUMENTS

| | | | |
|---|---|---|---|
| 6,255,597 B1 * | 7/2001 | Bowling ................ | H01B 17/00 174/138 F |
| 6,995,313 B1 | 2/2006 | Barnett | |
| 10,881,097 B2 * | 1/2021 | Lynch .................... | H01B 17/56 |
| 2012/0103681 A1 * | 5/2012 | Frye ....................... | H01B 17/00 174/5 SB |

OTHER PUBLICATIONS

Hot Stickable Universal Cut-Out Guard, Catalog ID CO10007, Hubbell Power Systems, Nov. 1, 2023.
ReliaGuard Hot Stickable Universal Cut-Out Guard, Catalog ID CO10007, Hubbell Incorporated.

* cited by examiner

*Primary Examiner* — Pete T Lee
(74) *Attorney, Agent, or Firm* — Richard Blakely Glasgow

(57)            ABSTRACT

A wildlife guard for protecting an electrical distribution cutout fuse holder from electrical shorts caused by wildlife is disclosed. The guard includes a first body piece pivotally connected to a second body piece, thereby creating a cover having an open bottom and an open front for receiving the cutout fuse holder and the insulator. A spring biases the cover to a closed position. The wildlife guard also includes a releasable trigger including a first trigger arm connected to a second trigger arm. The releasable trigger operates to hold the cover in the open position until contacted by the cutout fuse holder, which converts the cover to the closed position. The wildlife guard also includes spikes attached to the inner surfaces of the body pieces that impede wildlife from crawling under the cover.

13 Claims, 8 Drawing Sheets

WILDLIFE GUARD FOR CUTOUT FUSE HOLDER

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

Squirrels, birds, and the like often climb onto or perch on transformers, power lines, insulators, and other types of electrical distribution equipment. If the distance between an energized terminal and a ground or another terminal is too short, an animal may come into contact with both at the same time. This will typically cause an electrical short and kill the animal. It may also damage equipment and cause power outages. Wildlife guards are typically used as a barrier to maintain adequate space between the animal and the energized part to decrease the chances of an animal causing an electrical short. But installing wildlife guards can be time-consuming and dangerous because the installer often must be lifted high above the ground to reach the electrical distribution equipment. The entire line circuit must also be de-energized to perform this operation. And installing wildlife guards from the ground can be difficult. It would therefore be desirable to develop a wildlife guard for a cutout fuse holder and accompanying electrical distribution equipment that is easily installable from the ground without the need to de-energize the line circuit.

BRIEF SUMMARY OF THE INVENTION

The present invention is directed to a wildlife guard for protecting a cutout fuse holder that is attached to an insulator used in electrical distribution from shorts caused by wildlife. In one preferred embodiment, the wildlife guard includes a first body piece pivotally connected to a second body piece, thereby creating a cover having an open bottom and an open front for receiving the cutout fuse holder and the insulator. A spring biases the cover to a closed position. The wildlife guard also includes a releasable trigger including a first trigger arm connected to a second trigger arm. The first trigger arm is attached to the inner surface of the first body piece and the second trigger arm is attached to the inner surface of the second body piece. The releasable trigger is configured to hold the cover in the open position until contacted by the cutout fuse holder, which converts the cover to the closed position. The wildlife guard also includes spikes attached to the inner surfaces of the body pieces that impede wildlife from crawling under the cover.

In another preferred embodiment, the present invention is directed to a method of installing a wildlife guard on a cutout fuse holder attached to an insulator comprising the steps of: (1) providing a wildlife guard of the present invention; (2) converting the cover of the wildlife guard from the closed position to the open position by pulling the first body piece away from the second body piece to activate the trigger; and (3) pushing the wildlife guard on top of the cutout fuse holder and the insulator until the cutout fuse holder contacts the trigger, thereby causing the spring to convert the cover from the open position to the closed position.

These and other features, objects and advantages of the present invention will become better understood from a consideration of the following detailed description of the preferred embodiments and appended claims in conjunction with the drawings as described following:

DETAILED DESCRIPTION OF THE INVENTION

Figure 1:
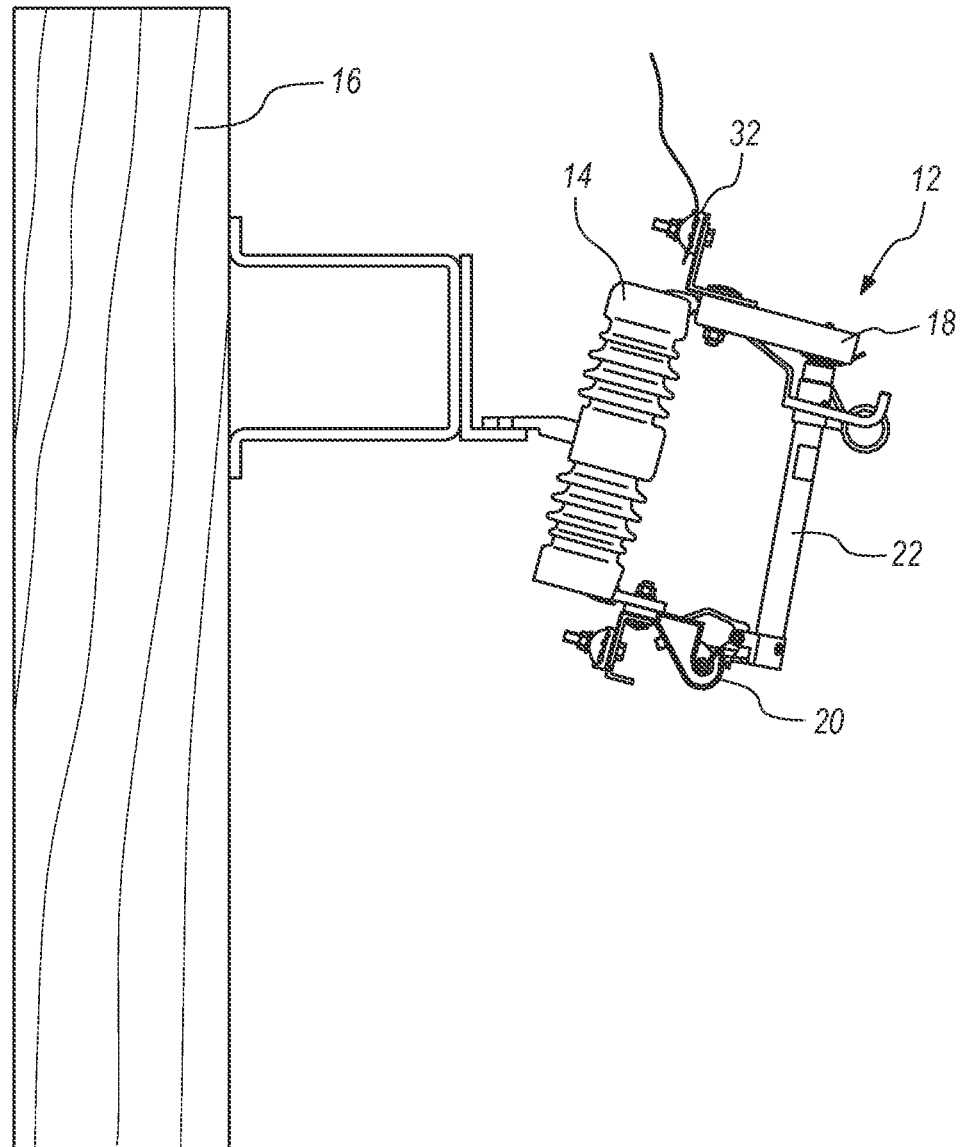
FIG. 1 is a perspective view of an insulator attached to a cutout fuse holder with a fuse in the closed position.
Figure 2:
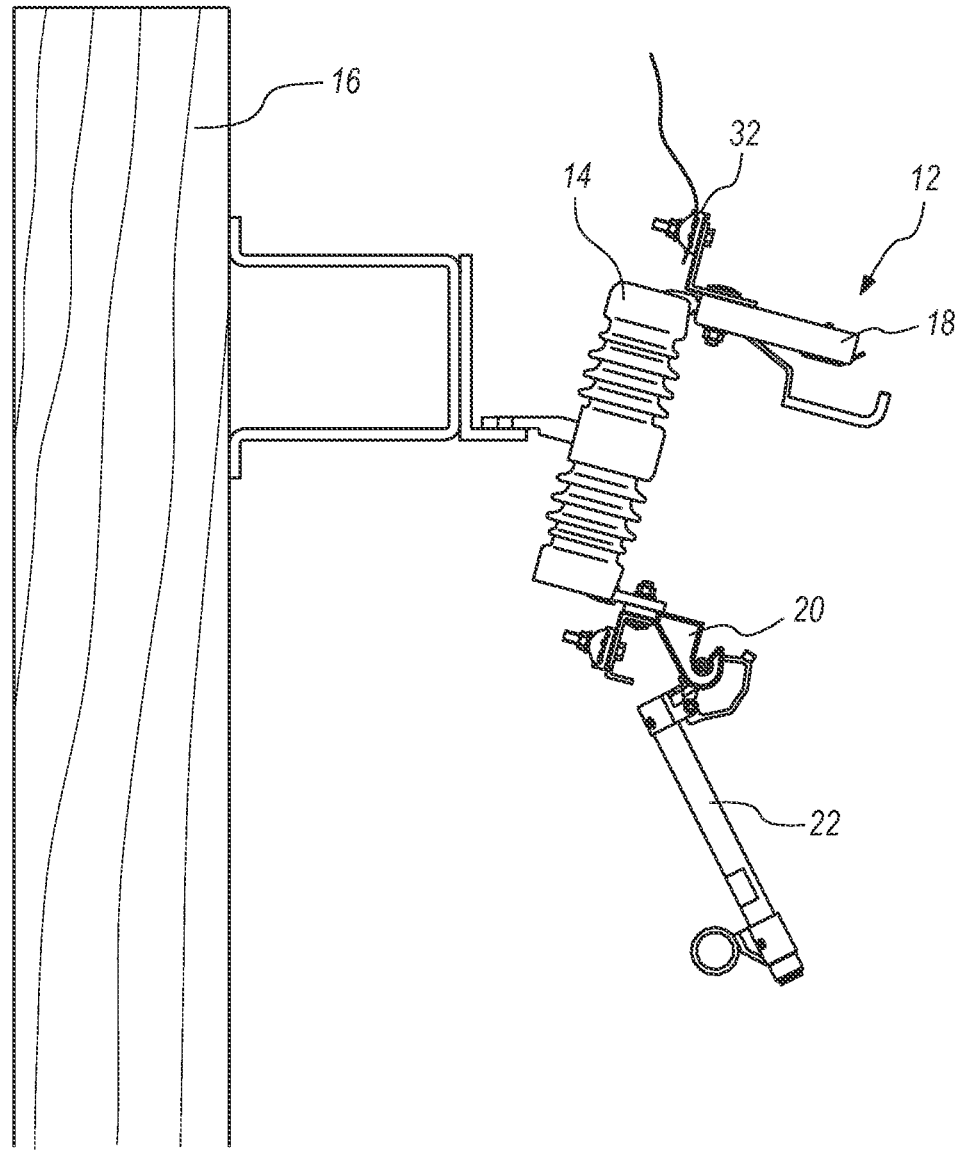
FIG. 2 is a perspective view of an insulator attached to a cutout fuse holder with a fuse in the open position.
Figure 3:
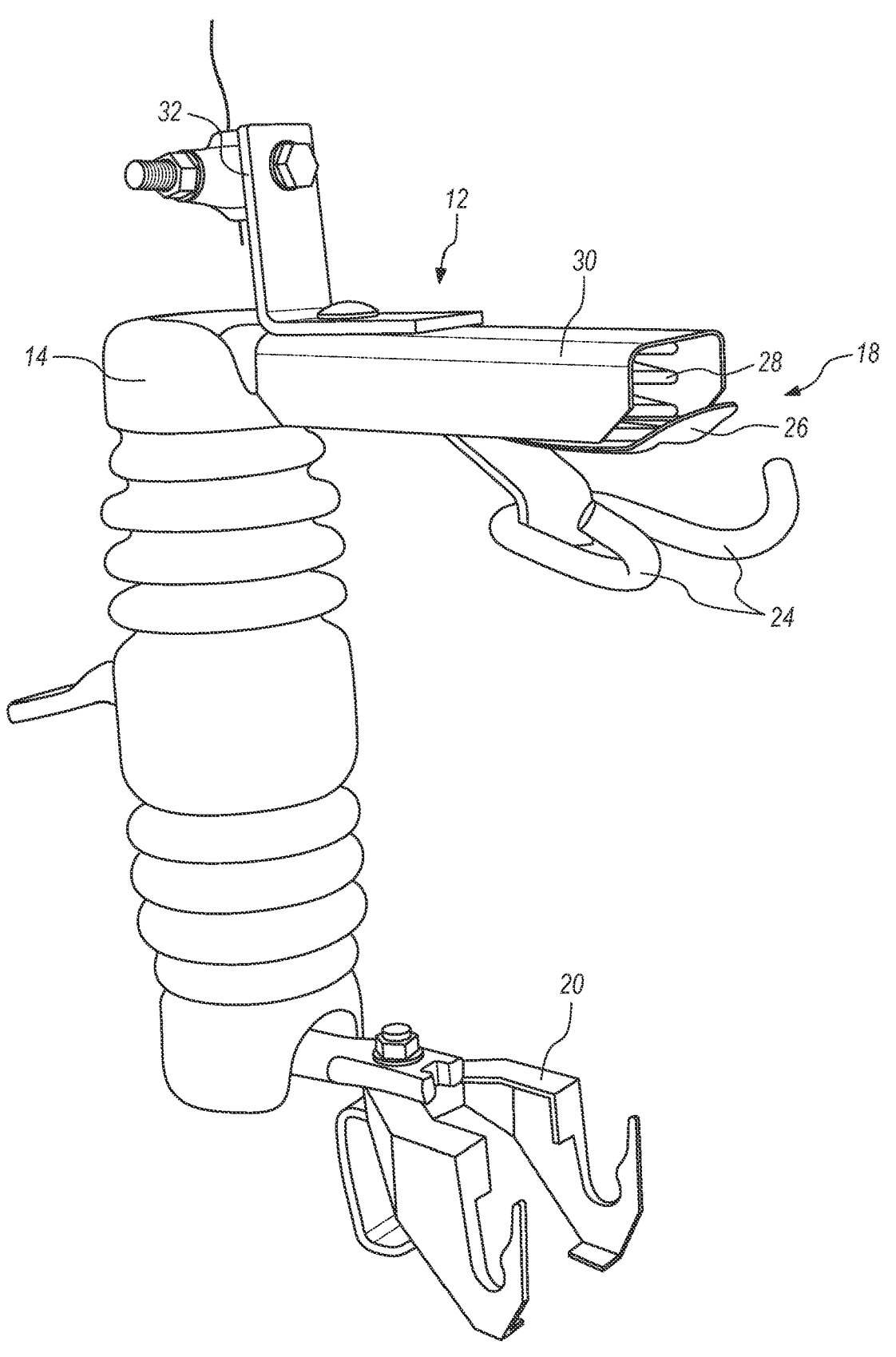
FIG. 3 is a perspective view of a cutout fuse holder with an attached parallel groove connector.
Figure 4:
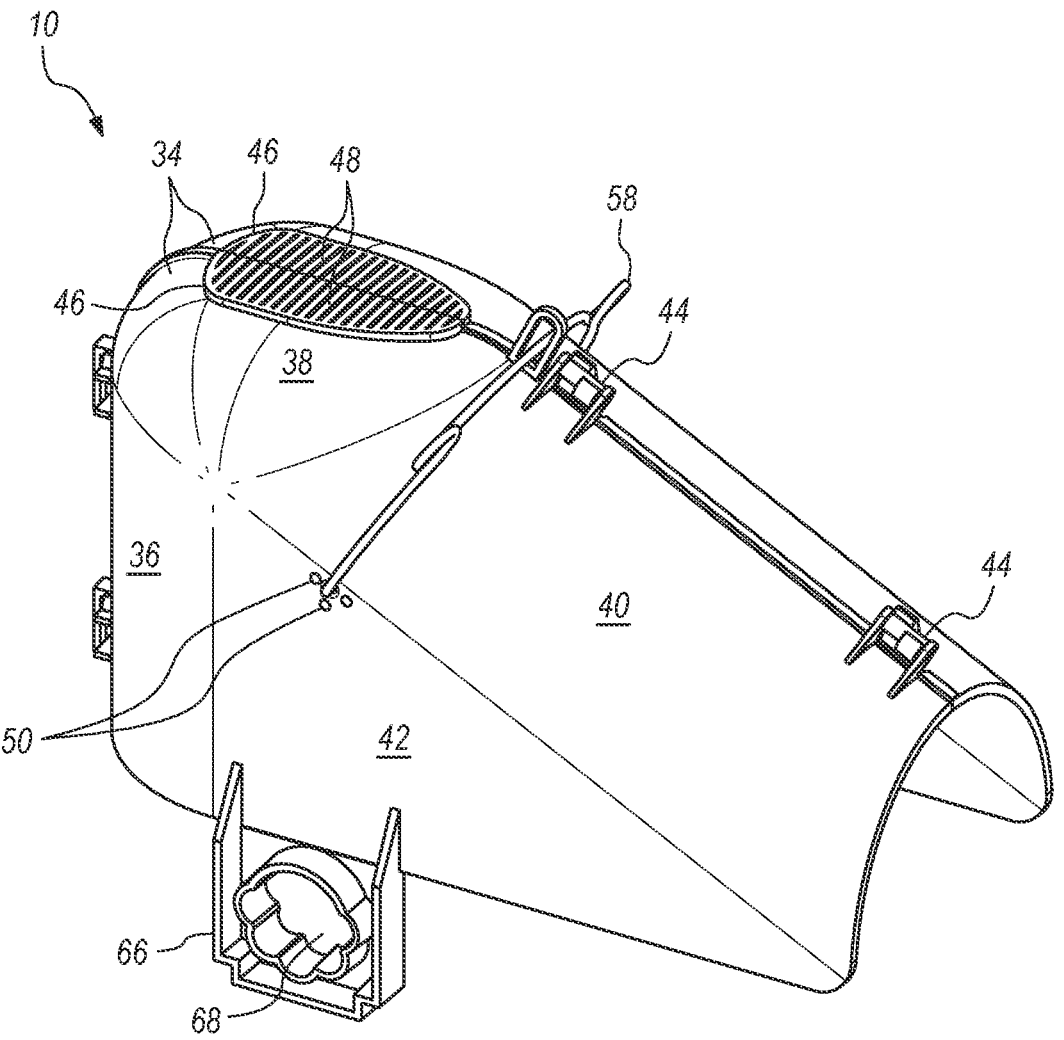
FIG. 4 is a top perspective view of the wildlife guard of the present invention.

With reference to FIGS. 1-8, the preferred embodiments of the present invention may be described. The present invention is a wildlife guard 10 for protecting a cutout fuse holder 12 that is attached to an insulator 14 used in electrical distribution from shorts caused by wildlife. As shown in FIGS. 1-2 and as well understood by a person of ordinary skill in the art, the insulator 14 is mounted to a utility pole 16. The cutout fuse holder (or cutout) 12 is attached to the top and bottom of the insulator 14 by a top arm assembly 18 and a bottom arm assembly 20. The fuse 22, which is a fuse tube, is inserted between the top arm assembly 18 and the bottom arm assembly 20. When the fuse tube 22 is contacting the top arm assembly 18 and the bottom arm assembly 20, the fuse 22 is in the closed position, as shown in FIG. 1. When the fuse tube 22 is only contacting the bottom arm assembly 20, the fuse 22 is in the open position, as shown in FIG. 2. The top arm assembly 18 includes attachment hooks 24 for guiding the fuse during insertion and closing, an upper contact 26 that is contacted by the end of the fuse tube, a spring 28 positioned above the upper contact 26 to ensure a tight fit of the tube fuse between the top arm and bottom arm assemblies, and a top plate 30. A parallel groove connector 32 is fastened to the top plate 30 of the top arm assembly 18. The parallel groove connector 32 is a wire connector. A wire is connected to the parallel groove connector 32 and the overhead power line. It is desirable to install the wildlife guard 10 over the top of the insulator 14, parallel groove connector 32 and top plate 30 of the top arm assembly 18 to maximize the insulating and protective value of the wildlife guard 10. The wildlife guard 10 has features that allow it to be easily aligned and installed on the top of the insulator 14 and the top plate 30 to protect the parallel groove connector 32 and the top plate 30 from being contacted by wildlife. Wildlife simultaneously contacting the top plate 30 or parallel groove connector 32 and the nearby ground node will cause the fuse to blow As shown in FIG. 4, the wildlife guard 10 comprises two body pieces 34 of insulating material. Each body section 34 includes a back section 36, a first top section 38, a second top section 40, and a side section 42. The back section 34 is curved towards the side section 42. The top of the back section 34 also is curved towards the first top section 38. The first top section 38 is positioned between the back section 36 and the second top section 40. The first top section 38 is curved towards the side section 42. The second top section 40 is also curved towards the side section 42. In addition, the second top section 40 slopes downwardly towards the front of the wildlife guard. A free edge of the second top section 40 is the front edge of the wildlife guard. The front and bottom of the wildlife guard 10 are open for receiving portions of the insulator 14 and cutout fuse holder 12.

Figure 8:
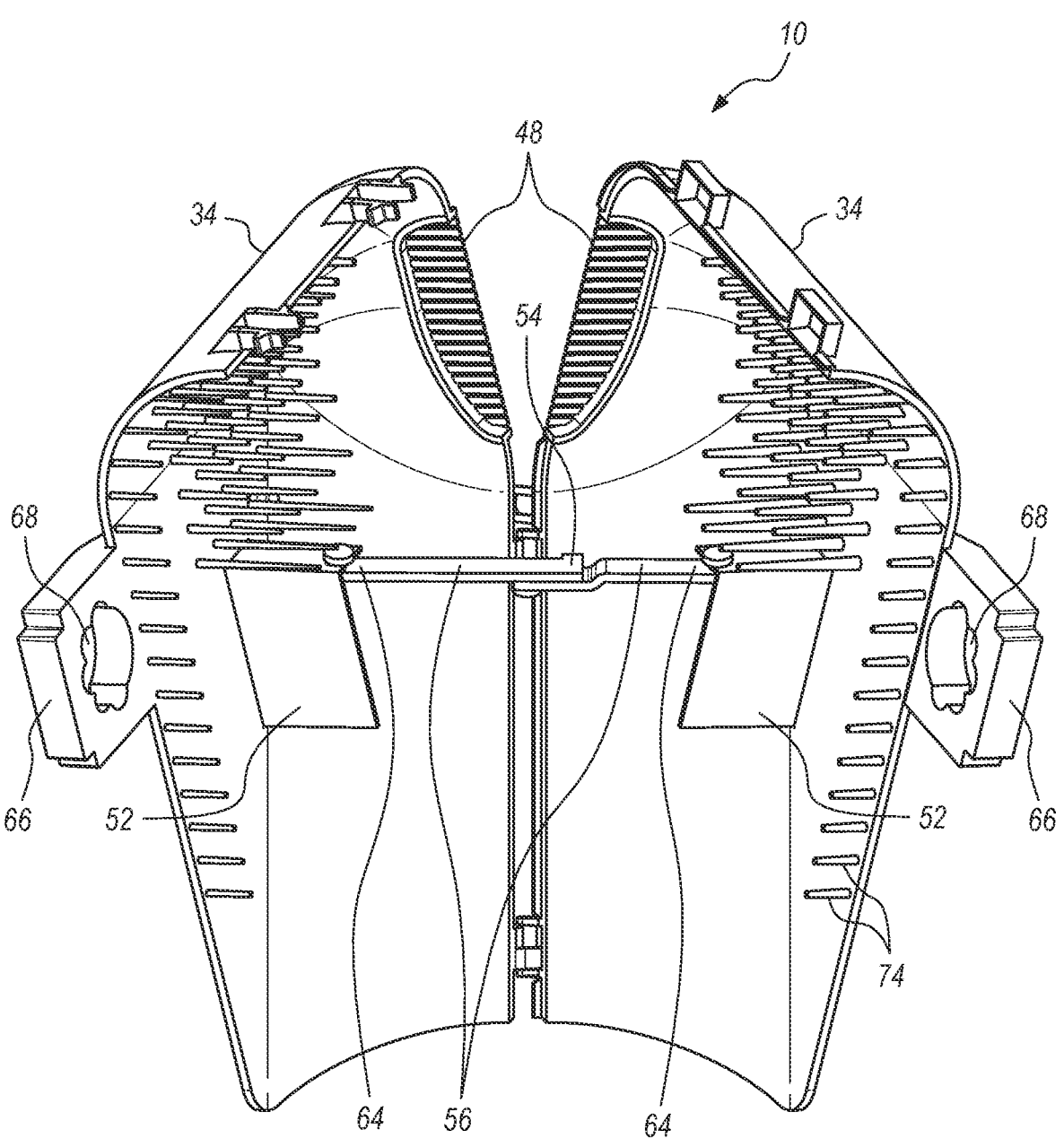
FIG. 8 is a bottom perspective view of the wildlife guard of the present invention in the open position.

The body pieces 34 are pivotally connected together along their second top sections 40, as shown in FIGS. 4 and 8. The pivotal attachment may be by hinges 44, although the present invention is not limited to pivotal connection using hinges. Other forms of pivotal connection known in the art would also be acceptable.

Figure 5:
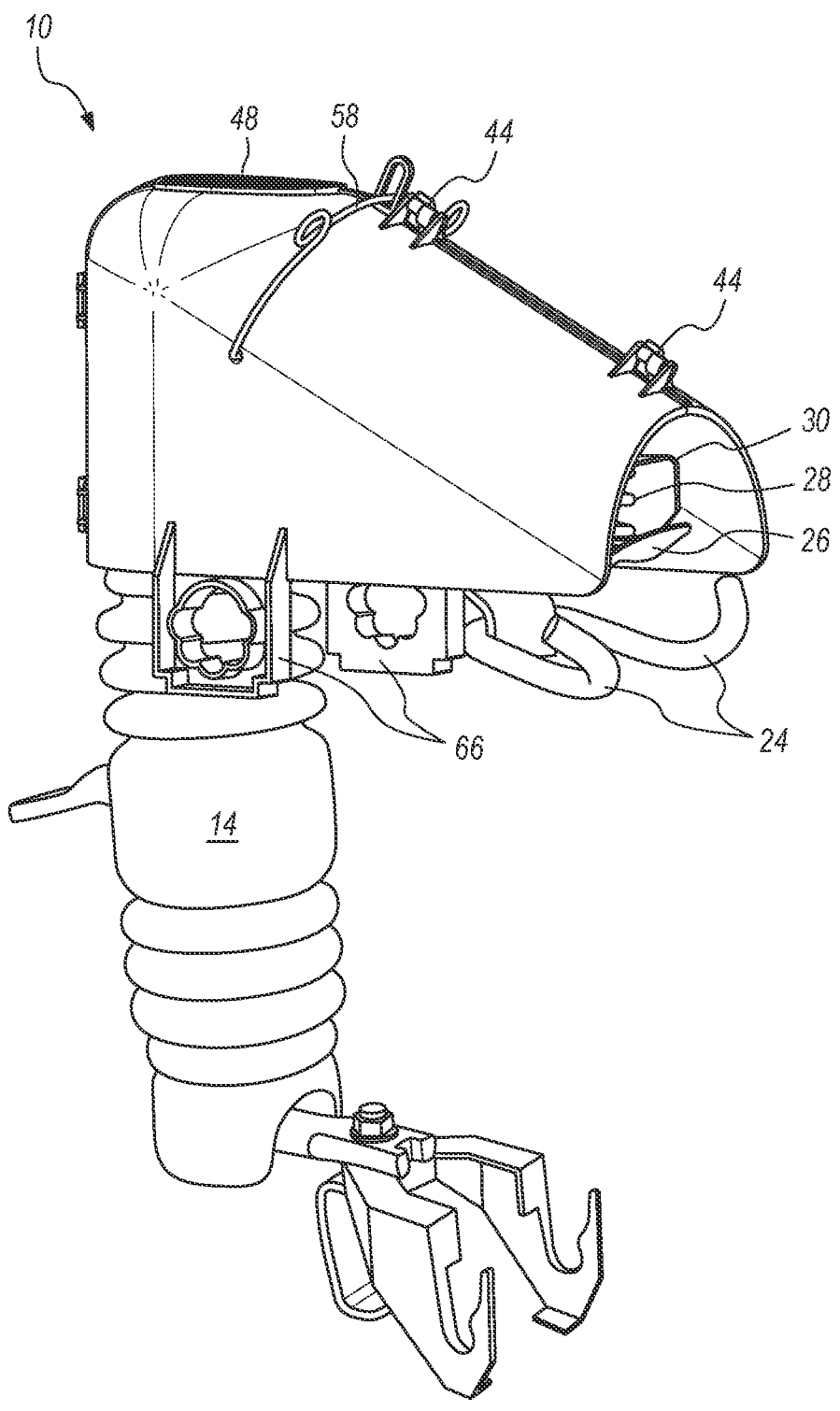
FIG. 5 is a perspective view of the wildlife guard of the present invention covering the top of an insulator attached to a cutout fuse holder.

When the two body pieces 34 are in the closed position as shown in FIGS. 4-5, the two body pieces 34 form an irregular shaped cover. As shown in FIGS. 4, each first top section 38 has a concave edge 46. The concave edge 46 is provided with a plurality of flexible fingers 48. The flexible fingers 48 from the opposing body pieces 34 face each other when the guard is in the closed position. The flexible fingers 34 allow a conductor (such as copper wires) to pass through from the interior to the exterior of the guard 10 when the two body pieces 34 of the guard are engaged.

The guard 10 is biased toward a closed position by a spring 58. The biasing spring 58 is desirably in the form of a semi-circular loop of resilient material that is connected to the side sections 42 of both body pieces 34. The spring 58 extends across the second top sections of both body pieces 34. The biasing spring 58 has short extensions at right angles to fit into slots 50 in the side sections 42.

The wildlife guard includes two positioning plates 52 attached to the inner surface of the wildlife guard. The positioning plates 52 are preferably L-shaped plates. A positioning plate 52 extends inwardly from each of the body pieces 34. In one embodiment, the positioning plates 52 extend from body pieces 34 at an approximately 90 degree angle. The positioning plates 52 serve as stops to prevent the top plate 30 of the cutout fuse holder from extending farther into the wildlife guard 10. The positioning plates 52 also serve as attachment points for a releasable trigger 54 of the wildlife guard. The inner surface of the body pieces 34 also include spikes 74. When the body pieces 34 are closed, the spikes of one body piece 34 face the spikes of the other body piece 34. The spikes occupy otherwise empty space under the wildlife guard 10 when it is positioned on the cutout fuse holder 12 and block wildlife from crawling under the wildlife guard 10. The spikes also aid in properly positioning the wildlife guard 10 on the cutout fuse holder 12. If the spikes contact the cutout fuse holder 12, insulator 14, or parallel groove connector 32 during installation of the wildlife guard 10, the wildlife guard 10 is deflected into the proper position on the cutout fuse holder 12, insulator 14, and parallel groove connector 32.

Figure 7:
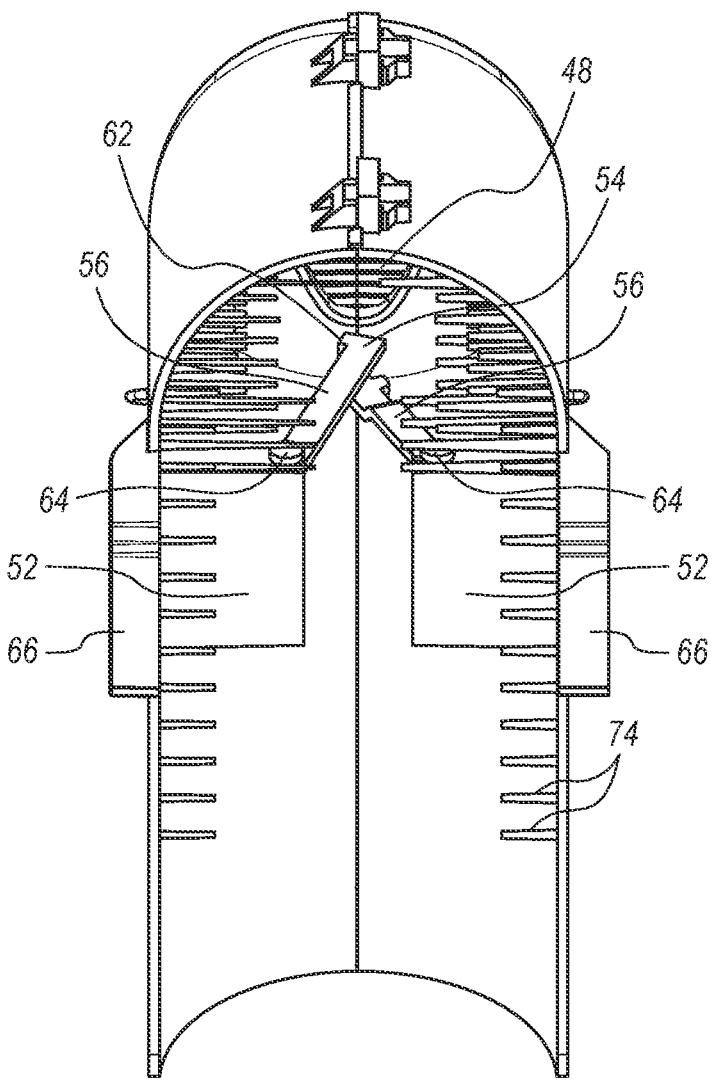
FIG. 7 is a bottom perspective view of the wildlife guard of the present invention in the closed position.

The releasable trigger 54 is used to hold the two body pieces 34 in an open position until the top plate 30 or parallel groove connector 32 displaces the trigger 54 and allows the biasing spring 58 to close the two pieces 34. The releasable trigger 54 comprises two trigger arms 56 pivotally connected at their inner ends. The outer ends 64 of the trigger arms 56 are pivotally connected to the positioning plates 52 in the interior of the guard. When the two body pieces 34 are opened against the biasing force of the spring 58 and the trigger arms 56 are in alignment as shown in FIG. 8, a quasi-stable configuration of the trigger arms 56 results and the two body pieces 34 are held apart against the closing force provided by the biasing spring 58. This activation (or setting) of the trigger can be accomplished by pulling the two body pieces apart from one another. When the inner pivot point is displaced slightly inwardly by contact with the top plate 30 or the parallel groove connector 32, the trigger arms 56 are no longer in a stable configuration and continue to pivot inwardly under the force of the biasing spring 58, thereby allowing the two body pieces 34 to close together as shown in FIG. 7. A stop 62 prevents the trigger arms 56 from being displaced outwardly from the quasi-stable configuration. Thus, the trigger arms 56 can only be displaced inwardly.

Figure 6:
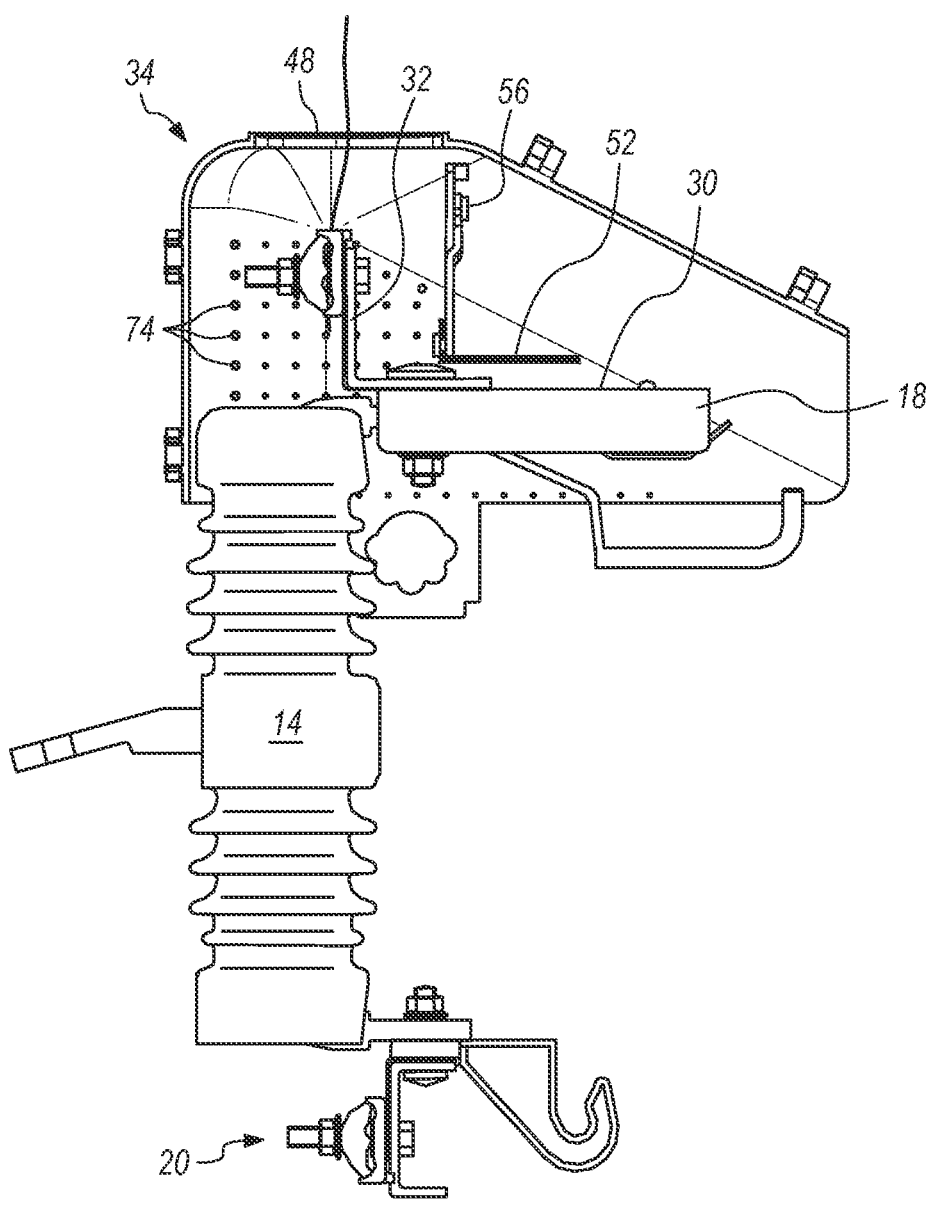
FIG. 6 is a side view of an insulator attached to a cutout fuse holder with one body piece of the wildlife guard of the present invention covering the top of the insulator and the cutout fuse holder.

A handle 66 extends downwardly from the bottom of the side sections 42 of the body pieces 34. Each handle 66 has an opening 68 with a plurality of inner grooves for engaging and manipulating the guard 10 with a widely-used type of manipulator tool known as shotgun stick. The present invention is not limited to the preferred embodiment of the handle 66 as described above. As used herein, the term "handle" refers to any appendage by which a manipulator tool may grasp the guard 10. To install the guard 10, a worker using a shotgun stick pushes the open guard 10 against the top of the top plate 30 of the cutout fuse holder 12. The trigger 54 is released as described above and the biasing spring 58 snaps the two body pieces 34 into engagement in a closed position to form a cover around the top of the insulator 14, cutout fuse holder 12, and parallel groove connector 32, as shown in FIGS. 5-6. The spikes 74 fit closely around and underneath the parallel groove connector 32 and the top of the insulator 14 when the two body pieces 34 are in the closed position.

As noted above, the guard 10 may be installed from the ground with a hotstick. The structure of a hotstick is described and illustrated in U.S. Pat. No. 6,995,313, which is incorporated by reference herein. The hotstick is designed to be fitted with a variety of tools since the end of the hotstick has a radially-arranged series of wedge-shaped protrusions which interlock with a similar arrangement of wedge-shaped protrusions on an adapter. The releasable adapter engages the handle 66 by sliding the handle 66 into a complementary recess in the adapter. The adapter is provided with an arrangement of radially-arranged wedge-shaped protrusions to complement the arrangement on the hotstick. The adapter is fastened to the end of the hotstick by a wingnut as is conventionally known at any suitable angle to the hotstick as determined by the operator. Once the wildlife guard 10 is installed on the cutout fuse holder 12, the adapter is easily disengaged from the handle 66 by sliding the adapter off the handle 66.

The present invention has been described with reference to certain preferred and alternative embodiments that are intended to be exemplary only and not limiting to the full scope of the present invention as set forth in the appended claims.

I claim:

1. A wildlife guard for a cutout fuse holder attached to an insulator, said wildlife guard comprising:

a first body piece having an inner surface and an outer surface;

a second body piece having an inner surface and an outer surface, wherein said first body piece is pivotally connected to said second body piece, thereby creating a cover comprising an open bottom and an open front for receiving said cutout fuse holder and said insulator, wherein said cover comprises an open position and a closed position;

a spring biasing said cover to a closed position, wherein said spring is connected to said outer surface of said first body piece and said outer surface of said second body piece;

a releasable trigger comprising a first trigger arm connected to a second trigger arm, wherein said first trigger arm is attached to said inner surface of said first body piece and said second trigger arm is attached to said inner surface of said second body piece, wherein said releasable trigger is configured to hold said cover in said open position until contacted by said cutout fuse holder; and a plurality of spikes attached to said inner surface of said first body piece and said inner surface of said second body piece, wherein said plurality of spikes are configured to impede wildlife from crawling under said cover.

2. The wildlife guard of claim 1, wherein a first handle extends from a bottom of said first body piece and a second handle extends from a bottom of said second body piece.

3. The wildlife guard of claim 1, wherein said spring extends across a top of said cover.

4. The wildlife guard of claim 1, wherein said first body piece comprises a first set of flexible fingers and said second body piece comprises a second set of flexible fingers, wherein said first set of flexible fingers face said second set of flexible fingers, wherein said first set of flexible fingers and said second set of flexible fingers are configured such that a wire attached to said cutout fuse holder can pass in between some of said first set of flexible fingers and said second set of flexible fingers.

5. The wildlife guard of claim 1, further comprising a first positioning plate connected to said inner surface of said first body piece and a second positioning plate connected to said inner surface of said second body piece, wherein said first trigger arm is connected to said first positioning plate and said second trigger arm is connected to said second positioning plate.

6. The wildlife guard of claim 1, further comprising a plurality of hinges.

7. A wildlife guard for a cutout fuse holder attached to an insulator, said wildlife guard comprising:

a first body piece having an inner surface and an outer surface, wherein said first body piece comprises a back section, a first top section, a second top section, and a side section;

a second body piece having an inner surface and an outer surface, wherein said second body piece comprises a back section, a first top section, a second top section, and a side section;

a plurality of hinges attached pivotally connecting said second top section of said first body piece and said second top section of said second body piece, thereby creating a cover comprising an open bottom and an open front for receiving said cutout fuse holder and said insulator, wherein said cover comprises an open position and a closed position;

a spring biasing said cover to a closed position, wherein said spring is connected to said outer surface of said first body piece and said outer surface of said second body piece; and a releasable trigger comprising a first trigger arm connected to a second trigger arm, wherein said first trigger arm is attached to said inner surface of said first body piece and said second trigger arm is attached to said inner surface of said second body piece, wherein said releasable trigger is configured to convert said cover from said open position to said closed position.

8. The wildlife guard of claim 7, further comprising a plurality of spikes attached to said inner surface of said first body piece and said inner surface of said second body piece to impede wildlife from crawling under said cover.

9. The wildlife guard of claim 7, wherein a first handle extends from a bottom of said first body piece and a second handle extends from a bottom of said second body piece.

10. The wildlife guard of claim 7, wherein said spring extends across a top of said cover.

11. The wildlife guard of claim 7, wherein said first body piece comprises a first set of flexible fingers and said second body piece comprises a second set of flexible fingers, wherein said first set of flexible fingers face said second set of flexible fingers, wherein said first set of flexible fingers and said second set of flexible fingers are configured such that a wire attached to said cutout fuse holder can pass in between some of said first set of flexible fingers and said second set of flexible fingers.

12. The wildlife guard of claim 7, further comprising a first positioning plate connected to said inner surface of said first body piece and a second positioning plate connected to said inner surface of said second body piece, wherein said first trigger arm is connected to said first positioning plate and said second trigger arm is connected to said second positioning plate.

13. A method of installing a wildlife guard on a cutout fuse holder attached to an insulator comprising the steps of:

providing a wildlife guard comprising:

a first body piece having an inner surface and an outer surface;

a second body piece having an inner surface and an outer surface, wherein said first body piece is pivotally connected to said second body piece, thereby creating a cover comprising an open bottom and an open front for receiving said cutout fuse holder and said insulator, wherein said cover comprises an open position and a closed position;

a spring biasing said cover to a closed position, wherein said spring is connected to said outer surface of said first body piece and said outer surface of said second body piece; and a releasable trigger comprising a first trigger arm connected to a second trigger arm, wherein said first trigger arm is attached to said inner surface of said first body piece and said second trigger arm is attached to said inner surface of said second body piece;

converting said cover from said closed position to said open position by pulling said first body piece away from said second body piece to activate said trigger; and pushing said wildlife guard on top of said cutout fuse holder and said insulator until said cutout fuse holder contacts said trigger, thereby causing said spring to convert said cover from said open position to said closed position.

* * * * *